(12) United States Patent
Molzon et al.

(10) Patent No.: US 12,206,710 B2
(45) Date of Patent: Jan. 21, 2025

(54) SYSTEMS AND METHODS FOR ENTERPRISE-LEVEL SECURITY POLICY MANAGEMENT TOOL

(71) Applicant: Rockwell Automation Technologies, Inc., Mayfield Heights, OH (US)

(72) Inventors: Dustin A. Molzon, Painesville, OH (US); Taryl J. Jasper, Concord Township, OH (US); Roch Mikolajczyk, Śląskie (PL)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 262 days.

(21) Appl. No.: 17/889,671

(22) Filed: Aug. 17, 2022

(65) Prior Publication Data

US 2024/0064174 A1 Feb. 22, 2024

(51) Int. Cl.
*H04L 9/40* (2022.01)
*G05B 19/418* (2006.01)
*G06F 21/60* (2013.01)

(52) U.S. Cl.
CPC .............. *H04L 63/20* (2013.01); *H04L 63/10* (2013.01)

(58) Field of Classification Search
CPC ....... H04L 63/20; H04L 63/10; H04L 63/205; H04L 9/40; G05B 19/4185; G06F 21/604
See application file for complete search history.

(56) References Cited

U.S. PATENT DOCUMENTS

| | | | | |
|---|---|---|---|---|
| 10,819,747 B1* | 10/2020 | Sedky | .................. | H04L 63/105 |
| 2010/0217850 A1* | 8/2010 | Ferris | ..................... | H04L 63/20 726/1 |
| 2010/0235887 A1* | 9/2010 | Burch | ..................... | H04L 63/20 726/4 |
| 2013/0031037 A1* | 1/2013 | Brandt | ................ | H04L 63/1408 706/12 |
| 2016/0087958 A1* | 3/2016 | Luo | ..................... | H04L 63/0209 713/168 |
| 2018/0069899 A1* | 3/2018 | Lang | ..................... | G06F 40/186 |
| 2018/0124114 A1* | 5/2018 | Woods | .................. | G06F 21/577 |
| 2018/0176186 A1* | 6/2018 | Chao | ................... | H04L 63/1425 |
| 2018/0299863 A1* | 10/2018 | Caine | ..................... | H04L 67/12 |

(Continued)

FOREIGN PATENT DOCUMENTS

| EP | 3001639 A1 | 3/2016 |
|---|---|---|
| EP | 3907969 A1 | 11/2021 |

OTHER PUBLICATIONS

Extended European Search Report for Application No. 23183301.3 mailed Dec. 22, 2023, 7 pages.

*Primary Examiner* — Darren B Schwartz
(74) *Attorney, Agent, or Firm* — Fletcher Yoder, P.C.

(57) ABSTRACT

An enterprise-level security policy management tool receives, via a graphical user interface (GUI), inputs defining a security policy configured to be deployed within an enterprise that operates one or more operational technology (OT) networks, generates the security policy based on the inputs, and transmits the security policy to one or more computing devices running respective other instantiations of the enterprise-level security policy management tool, wherein the respective other instantiations of the enterprise-level security policy management tool are configured to facilitate enforcement of the security policy within the one or more OT networks operated by the enterprise.

20 Claims, 9 Drawing Sheets

(56) References Cited

U.S. PATENT DOCUMENTS

| | | |
|---|---|---|
| 2018/0367568 A1 | 12/2018 | Martinez et al. |
| 2020/0120143 A1 | 4/2020 | Nicoll et al. |
| 2020/0177458 A1* | 6/2020 | Rahman .............. H04L 41/0631 |
| 2021/0351980 A1* | 11/2021 | Huffman ................ G06F 21/554 |
| 2023/0156030 A1* | 5/2023 | Bassi .................. H04L 63/1408 |
| | | 726/25 |
| 2023/0199029 A1* | 6/2023 | Guo ........................ H04L 63/20 |
| | | 726/1 |

* cited by examiner

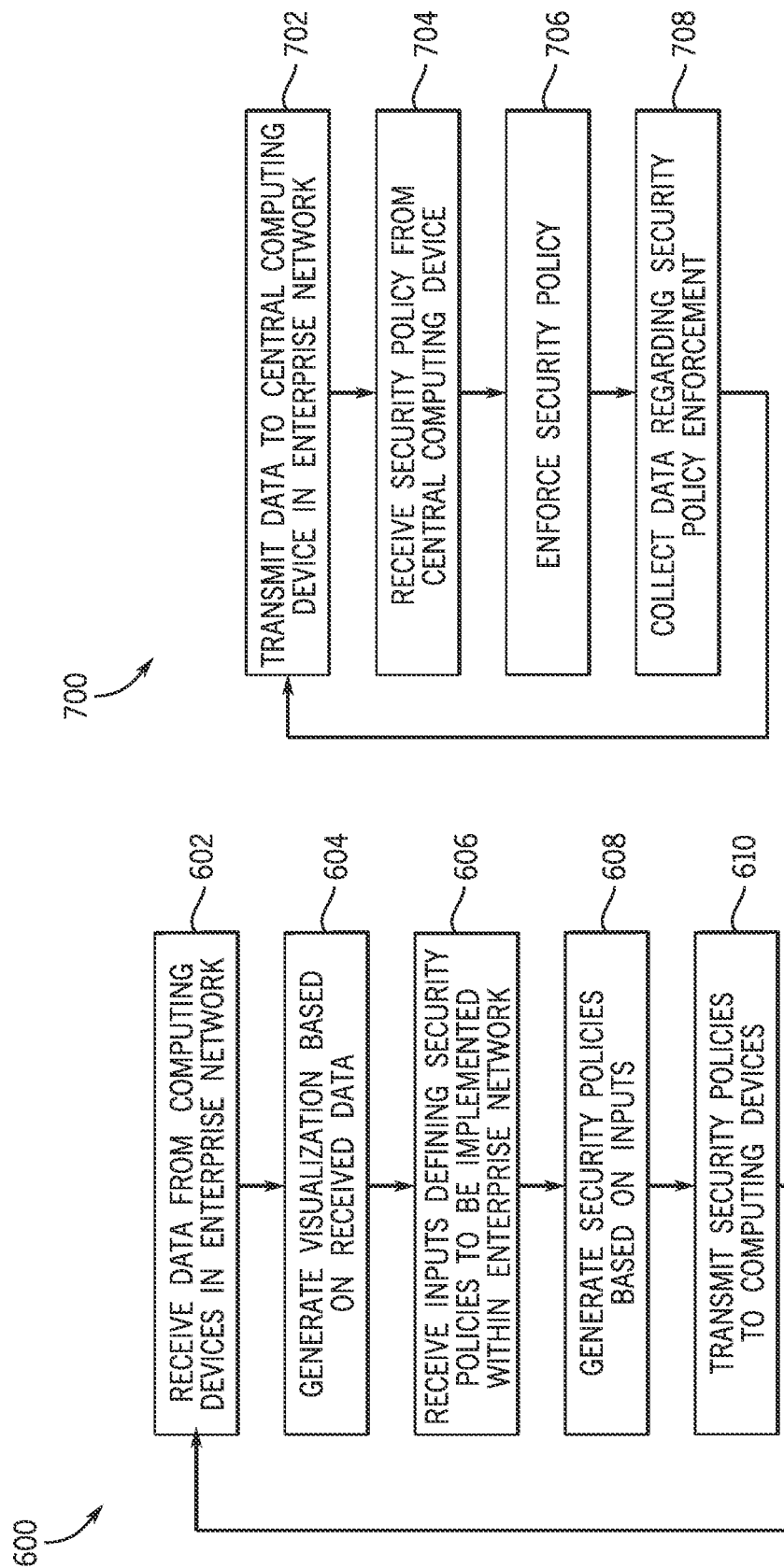

SYSTEMS AND METHODS FOR ENTERPRISE-LEVEL SECURITY POLICY MANAGEMENT TOOL

BACKGROUND

The present disclosure generally relates to tools for managing security policies for enterprises that operate one or more operational technology (OT) networks.

Industrial automation systems may be used to provide automated control of one or more actuators in an industrial setting. OT networks may be used to communicatively couple industrial automation systems and/or industrial automation components within an industrial automation system. Security policies may dictate access to and use of OT assets within the OT network. Typically, security policies are manually created and implemented within an OT network (e.g., via an enforcement point) and/or applied to an industrial automation component by one or more network administrators. Accordingly, implementing new security policies or modifying existing security polices throughout an enterprise that operates many OT networks may be a time consuming and otherwise resource intensive process that may take weeks, months, or even years. Accordingly, techniques for efficiently managing security policies throughout an enterprise are desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a non-transitory computer readable medium storing instructions defining an instantiation of an enterprise-level security policy management tool that, when executed by a processor, cause the processor to perform operations including receiving, via a graphical user interface (GUI), inputs defining a security policy configured to be deployed within an enterprise that operates one or more operational technology (OT) networks, generating the security policy based on the inputs, and transmitting the security policy to one or more computing devices running respective other instantiations of the enterprise-level security policy management tool, wherein the respective other instantiations of the enterprise-level security policy management tool are configured to facilitate enforcement of the security policy within the one or more OT networks operated by the enterprise.

In another embodiment, non-transitory computer readable medium storing instructions defining an instantiation of a security policy management tool that, when executed by a processor, cause the processor to perform operations including transmitting, to a central computing device running an enterprise-level instantiation of the security policy management tool, data associated with operations of an operational technology (OT) network operated by an enterprise, wherein the central computing device running the enterprise-level instantiation of the security policy management tool is configured to manage security policies for two or more OT networks, including the OT network, receiving, from the central computing device running the enterprise-level instantiation of the security policy management tool, a security policy, and facilitating enforcement of the security policy within the OT network operated by the enterprise.

In a further embodiment, a method incudes receiving data from a plurality of computing devices disposed in a plurality of operational technology (OT) networks operated by an enterprise, wherein the data is associated with operations of the plurality of the OT networks, generating a GUI configured to display information regarding components within the plurality of the OT networks, the operations of the plurality of the OT networks, or both, wherein the GUI is displayed within an instantiation of a security policy management tool, receiving, via the GUI, inputs defining a security policy configured to be deployed within one or more of the plurality of the OT networks operated by the enterprise, generating the security policy based on the inputs, and transmitting the security policy to one or more of the plurality of computing devices running respective other instantiations of the security policy management tool, wherein the respective other instantiations of the security policy management tool are configured to facilitate enforcement of the security policy within one or more of the plurality of OT networks operated by the enterprise.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present embodiments will become better understood when the following detailed description is read with reference to the accompanying drawings in which like characters represent like parts throughout the drawings, wherein.

Figure 1:
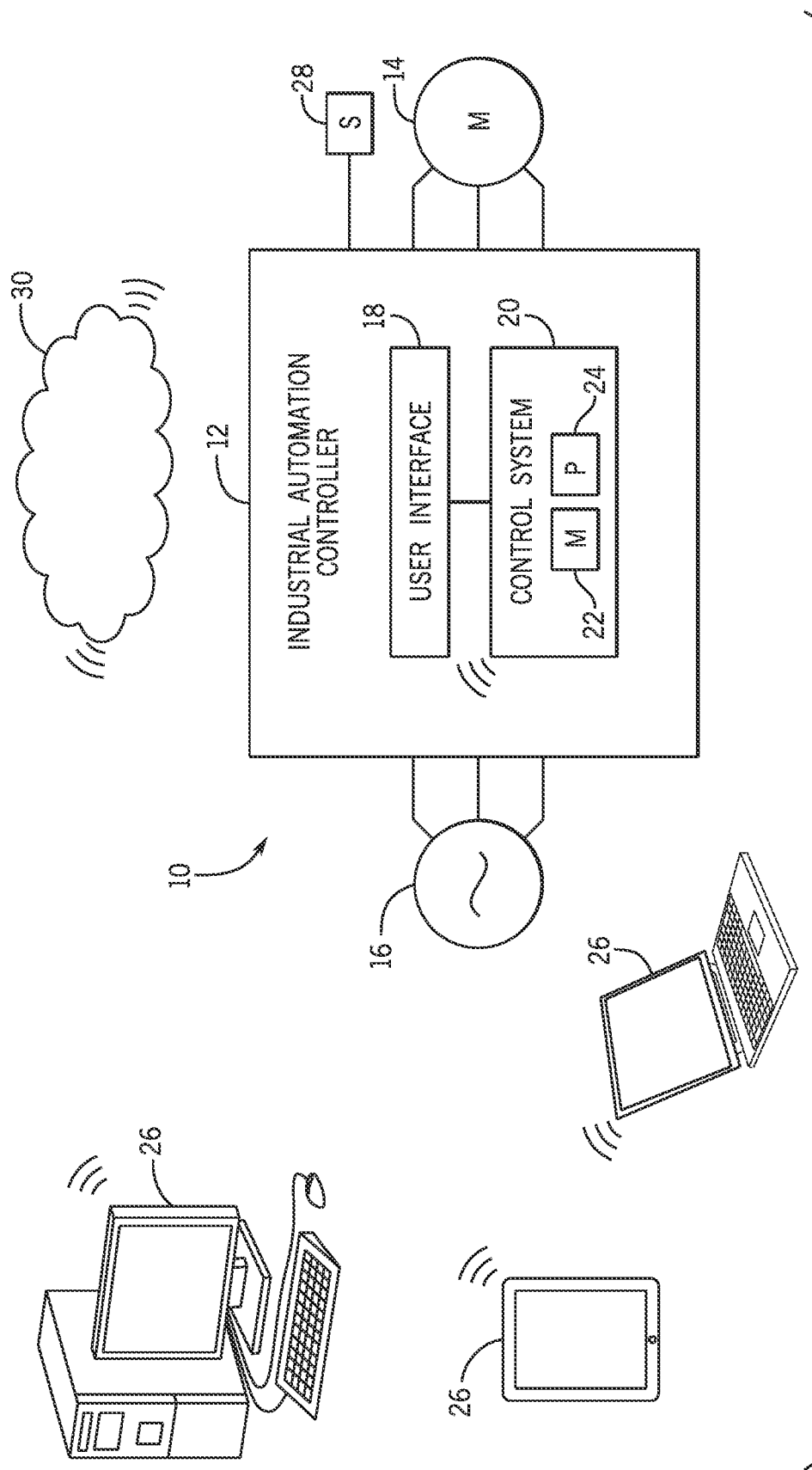
FIG. 1 illustrates a schematic view of an industrial automation system, in accordance with embodiments presented herein.

FIG. 9 is a flow chart of a process for managing security policies within an enterprise that operates multiple OT networks from the perspective of a centrally located instantiation of the enterprise-level security policy management tool, in accordance with embodiments presented herein; and FIG. 10 is a flow chart of a process for receiving and enforcing security policies within an OT network from the perspective of a local instantiation of the security policy management tool, in accordance with embodiments presented herein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure includes techniques for managing security policies within an enterprise that operates one or more OT networks. Specifically, data may be passed from industrial automation devices at the device level of an OT network, or from industrial automation systems at the system level of the OT network up to the enterprise level. In some embodiments, data may pass through one or more aggregation points at which data from multiple sources is aggregated. In some embodiments, metadata and/or contextual data may be added at aggregation points. A GUI may be generated based on the received data and displayed to a user. The GUI may be part of an enterprise-level security policy management tool that allows the user to manage security policies within OT networks operated by the enterprise. Specifically, the user may provide inputs, via the GUI, that define new security policies or modify existing security policies. The enterprise-level security policy management tool may then generate security policies to be deployed throughout the OT network(s) operated by the enterprise. Just as collected data may work its way up the OT network from the system/device level to the enterprise level through aggregation points, security policies may work their way down the OT network from the enterprise level to the system/device level via one or more distribution points, which may or may not be the same as the aggregation points. In some embodiments, the security policies may be transmitted to security policy enforcement points that enforce the security policies within the OT network. Additional details with regard to managing security policies within an enterprise in accordance with the techniques described above will be provided below with reference to FIGS. 1-10.

By way of introduction, FIG. 1 is a schematic view of an example industrial automation system 10 in which the embodiments described herein may be implemented. As shown, the industrial automation system 10 includes a controller 12 and an actuator 14 (e.g., a motor). The industrial automation system 10 may also include, or be coupled to, a power source 16. The power source 16 may include a generator, an external power grid, a battery, or some other source of power. The controller 12 may be a stand-alone control unit that controls multiple industrial automation components (e.g., a plurality of motors 14), a controller 12 that controls the operation of a single automation component (e.g., motor 14), or a subcomponent within a larger industrial automation system 10. In the instant embodiment, the controller 12 includes a user interface 18, such as a human machine interface (HMI), and a control system 20, which may include a memory 22 and a processor 24. The controller 12 may include a cabinet or some other enclosure for housing various components of the industrial automation system 10, such as a motor starter, a disconnect switch, etc.

The control system 20 may be programmed (e.g., via computer readable code or instructions stored on the memory 22, such as a non-transitory computer readable medium, and executable by the processor 24) to provide signals for controlling the motor 14. In certain embodiments, the control system 20 may be programmed according to a specific configuration desired for a particular application. For example, the control system 20 may be programmed to respond to external inputs, such as reference signals, alarms, command/status signals, etc. The external inputs may originate from one or more relays or other electronic devices. The programming of the control system 20 may be accomplished through software or firmware code that may be loaded onto the internal memory 22 of the control system 20 (e.g., via a locally or remotely located computing device 26) or programmed via the user interface 18 of the controller 12. The control system 20 may respond to a set of operating parameters. The settings of the various operating parameters may determine the operating characteristics of the controller 12. For example, various operating parameters may determine the speed or torque of the motor 14 or may determine how the controller 12 responds to the various external inputs. As such, the operating parameters may be used to map control variables within the controller 12 or to control other devices communicatively coupled to the controller 12. These variables may include, for example, speed presets, feedback types and values, computational gains and variables, algorithm adjustments, status and feedback variables, programmable logic controller (PLC) control programming, and the like.

In some embodiments, the controller 12 may be communicatively coupled to one or more sensors 28 for detecting operating temperatures, voltages, currents, pressures, flow rates, and other measurable variables associated with the industrial automation system 10. With feedback data from the sensors 28, the control system 20 may keep detailed track of the various conditions under which the industrial automation system 10 may be operating. For example, the feedback data may include conditions such as actual motor speed, voltage, frequency, power quality, alarm conditions, etc. In some embodiments, the feedback data may be communicated back to the computing device 26 for additional analysis.

The computing device 26 may be communicatively coupled to the controller 12 via a wired or wireless connection. The computing device 26 may receive inputs from a user defining an industrial automation project using a native application running on the computing device 26 or using a web site accessible via a browser application, a software application, or the like. The user may define the industrial automation project by writing code, interacting with a visual programming interface, inputting or selecting values via a graphical user interface, or providing some other inputs. The user may use licensed software and/or subscription services to create, analyze, and otherwise develop the project. The computing device 26 may send a project to the controller 12 for execution. Execution of the industrial automation project causes the controller 12 to control components (e.g., motor 14) within the industrial automation system 10 through performance of one or more tasks and/or processes. In some applications, the controller 12 may be communicatively positioned in a private network and/or behind a firewall, such that the controller 12 does not have communication access outside a local network and is not in communication with any devices outside the firewall, other than the computing device 26. The controller 12 may collect feedback data during execution of the project, and the feedback data may be provided back to the computing device 26 for analysis. Feedback data may include, for example, one or more execution times, one or more alerts, one or more error messages, one or more alarm conditions, one or more temperatures, one or more pressures, one or more flow rates, one or more motor speeds, one or more voltages, one or more frequencies, and so forth. The project may be updated via the computing device 26 based on the analysis of the feedback data.

The computing device 26 may be communicatively coupled to a cloud server 30 or remote server via the internet, or some other network. In one embodiment, the cloud server 30 may be operated by the manufacturer of the controller 12, a software provider, a seller of the controller 12, a service provider, operator of the controller 12, owner of the controller 12, etc. The cloud server 30 may be used to help customers create and/or modify projects, to help troubleshoot any problems that may arise with the controller 12, develop security policies, or to provide other services (e.g., project analysis, enabling, restricting capabilities of the controller 12, data analysis, controller firmware updates, etc.). The remote/cloud server 30 may be one or more servers operated by the manufacturer, software provider, seller, service provider, operator, or owner of the controller 12. The remote/cloud server 30 may be disposed at a facility owned and/or operated by the manufacturer, software provider, seller, service provider, operator, or owner of the controller 12. In other embodiments, the remote/cloud server 30 may be disposed in a datacenter in which the manufacturer, software provider, seller, service provider, operator, or owner of the controller 12 owns or rents server space. In further embodiments, the remote/cloud server 30 may include multiple servers operating in one or more data center to provide a cloud computing environment.

Figure 2:
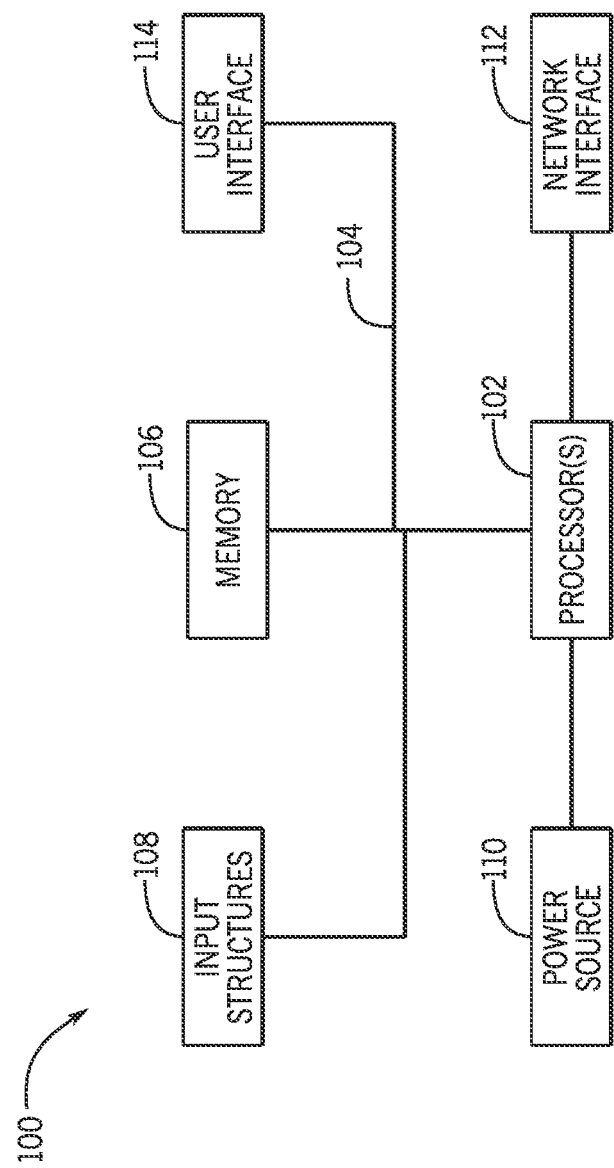
FIG. 2 illustrates a block diagram of example components that could be used in the industrial automation system of FIG. 1, in accordance with embodiments presented herein.

FIG. 2 illustrates a block diagram of example components of a computing device 100 that could be used as the computing device 26, the cloud/remote server 30, the controller 12, or some other device within the system 10 shown in FIG. 1. As used herein, a computing device 100 may be implemented as one or more computing systems including laptop, notebook, desktop, tablet, HMI, or workstation computers, as well as server type devices or portable, communication type devices, such as cellular telephones and/or other suitable computing devices.

As illustrated, the computing device 100 may include various hardware components, such as one or more processors 102, one or more busses 104, memory 106, input structures 112, a power source 114, a network interface 116, a user interface 118, and/or other computer components useful in performing the functions described herein.

The one or more processors 102 may include, in certain implementations, microprocessors configured to execute instructions stored in the memory 106 or other accessible locations. Alternatively, the one or more processors 102 may be implemented as application-specific integrated circuits (ASICs), field-programmable gate arrays (FPGAs), and/or other devices designed to perform functions discussed herein in a dedicated manner. As will be appreciated, multiple processors 102 or processing components may be used to perform functions discussed herein in a distributed or parallel manner.

The memory 106 may encompass any tangible, non-transitory medium for storing data or executable routines. Although shown for convenience as a single block in FIG. 2, the memory 106 may encompass various discrete media in the same or different physical locations. The one or more processors 102 may access data in the memory 106 via one or more busses 104.

The input structures 112 may allow a user to input data and/or commands to the device 100 and may include mice, touchpads, touchscreens, keyboards, controllers, and so forth. The power source 114 can be any suitable source for providing power to the various components of the computing device 100, including line and battery power. In the depicted example, the device 100 includes a network interface 116. Such a network interface 116 may allow communication with other devices on a network using one or more communication protocols. In the depicted example, the device 100 includes a user interface 118, such as a display that may display images or data provided by the one or more processors 102. The user interface 118 may include, for example, a monitor, a display, and so forth. As will be appreciated, in a real-world context a processor-based system, such as the computing device 100 of FIG. 2, may be employed to implement some or all of the present approach, such as performing the functions of the controller, the computing device 26, and/or the cloud/remote server 30 shown in FIG. 1, as well as other memory-containing devices.

Figure 3:
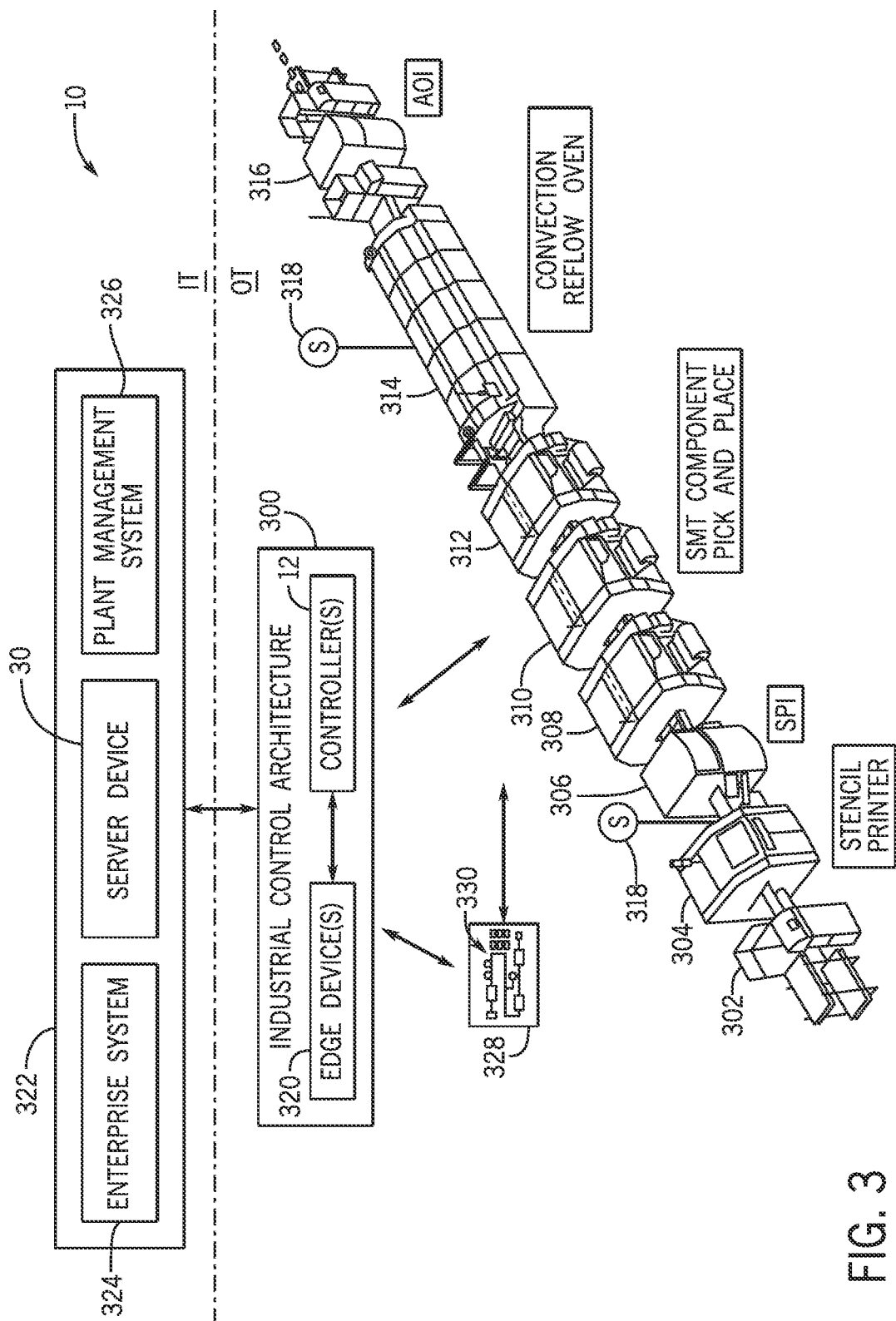
FIG. 3 illustrates a schematic of an example industrial automation system controlled by an industrial control architecture, in accordance with embodiments presented herein.

FIG. 3 is a perspective view of an example industrial automation system 10 controlled by an industrial control architecture 300. The industrial automation system 10 includes stations having machine components and/or machines (e.g., OT assets) to conduct functions within an automated process, such as silicon wafer manufacturing, as is depicted. The automated process may begin at station 302 used for loading objects, such as substrates, into the industrial automation system 10 via a conveyor section. The conveyor section may transport the objects to a station 304 to perform a first action, such as printing solder paste to the substrate via stenciling. As objects exit from the station 304, the conveyor section may transport the objects to a station 306 for solder paste inspection (SPI) to inspect printer results, to a station 308, 310, and 312 for surface mount technology (SMT) component placement, to a station 314 for a convection reflow oven to melt the solder to make electrical couplings, and finally to a station 316 for automated optical inspection (AOI) to inspect the object manufactured (e.g., the manufactured printed circuit board). After the objects have passed through the various stations, the objects may be removed from the station 316, for example, for storage in a warehouse or for shipment. It should be understood, however, for other applications, the particular system, machine components, machines, stations, and/or conveyors may be different from the system depicted in FIG. 3 or spatially adapted to the application.

For example, the industrial automation system 10 may include machinery (e.g., OT assets) to perform various operations in a compressor station, an oil refinery, a batch operation for making food items, pharmaceuticals, cosmetics, chemical processing operations, brewery operations, mining operations, a mechanized assembly line, and so forth. Accordingly, the industrial automation system 10 may include a variety of operational components (e.g., OT assets), such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of OT data regarding operation, status, sensor data, operational modes, alarm conditions, or the like, that may be desirable to output for analysis with information technology (IT) data from an IT network, for storage in an IT network, or the like.

In certain embodiments, one or more properties of equipment of the industrial automation system 10, such as the stations 302, 304, 306, 308, 310, 312, 314, 316, may be monitored and controlled by the industrial automation system 10 for regulating control variables. For example, sensing devices (e.g., sensors 318) may monitor various properties of the industrial automation system 10 and may be used by the industrial control architecture 300 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control architecture 300 may receive data from the associated devices and use the data to perform their respective operations more efficiently. For example, a controller 12 of the industrial control architecture 300 may receive data regarding a temperature of a connected motor and may adjust operations of the motor drive based on the data.

An edge device 320 of the industrial control architecture 300 may automatically deploy, enforce, and/or implement one or more security updates to one or more policy enforcement points (e.g., OT assets) within the industrial automation system 10. Accordingly, the edge device may be considered a security policy enforcement point. As used herein, an "edge device" 320 is a device within the industrial automation system 10 that controls data flow within the industrial automation system 10 (e.g., the OT network) as well as between the industrial automation system 10 (e.g., the OT network) and an external network 322. For example, the edge device 320 may be a router, a switch, or the like. In certain embodiments, the edge device 320 may receive a security update from the external network 322 that includes an enterprise system 324, a server device 30, a plant management system 326, or the like. The enterprise system 324 may include software and/or hardware components that support business processes, information flows, reporting, data analytics, and the like for an enterprise. The server device 30 may include any suitable server computing device. In one embodiment, the server device 30 may include a security policy server that manages communication between the components of the industrial automation system 10. That is, the security policy server may manage one or more security policies that include provisions or instructions that detail how communication between the components of the industrial automation system 10 is performed. As such, the server device 30 may implement a security policy (e.g., a security update) related to centrally managing communications between the components of the industrial automation system 10. The plant management system 326 may include any suitable management computing system that receives data from a number of control systems (e.g., industrial control architecture 300). As such, the plant management system 326 may track operations of one or more facilities and one or more locations. In addition, the plant management system 326 may issue control commands to the components of the industrial automation system 10.

A security policy is a set of one or more rules or procedures that govern access and use of an organization's OT assets (e.g., industrial automation devices associated with OT machines). Characteristics of security policies may include confidentiality, availability, integrity, authentication, and non-repudiation of the organization's OT assets. A security policy may include identification data or information for components of the industrial automation system 10, or endpoints thereof, that are to be trusted, information regarding which communication ports to use, and the like. As such, a security policy sets forth provisions that may govern management of OT assets, access to such assets, backups of such assets, security of such assets, and the like. For example, a security policy may define provisions addressing acceptable usage of OT/IT assets, antivirus management, data backup and disaster recovery, change management, cryptography usage, data and asset classification, data retention, data support and operations, data usage, email/messaging protection policies, user identity and access management, incident response, threat protection, internet usage restrictions, mobile device policy, OT/IT network security, password and credential protocols, firmware/patch management, personnel security, physical and environmental security, malware/spyware/ransomware detection, system update schedules, wireless network access, guest access, and so forth. Accordingly, a security policy may govern, for example, how to manage who has access to what OT devices, what files and/or communications should be encrypted, characteristics of passwords (e.g., number of characters, upper and lower case letters, numbers, special characters), how often users must change their passwords, how often backups are done, how long backups are retained, guidelines for accessing wireless internet, what happens when a threat occurs, processes for onboarding/ offboarding users as they start and leave positions, the process that occurs when a user changes roles, maintenance procedures, and so forth.

As used herein, a "security update" may refer to a new security policy to be implemented by the OT asset or enforced at one or more security policy enforcement points within the industrial automation system 10, an update to an existing security policy implemented by the OT asset or enforced at the one or more security policy enforcement points within the industrial automation system 10, a new security setting to be implemented by the OT asset, an update to an existing security setting implemented by the OT asset, a new security rule to be implemented by the OT asset, an update to an existing security rule implemented by the OT asset, software (e.g., code) to be implemented by the OT asset, an update to at least a portion of software (e.g., code) implemented by the OT asset, data (e.g., configuration data) to be utilized by the software implemented by the OT asset, an update to existing data (e.g., configuration data) utilized by the software implemented by the OT asset, a new version of firmware to be implemented by the OT asset, an update to an existing version of firmware implemented by the OT asset, or the like. After receiving one or more security updates from the external network 322, the edge device 320 may push a security update to the components of the industrial automation system 10, or the components of the industrial automation system 10 may pull the security update from the edge device 320.

The industrial control system 12 may be communicatively coupled to a display/operator interface 328 (e.g., a human-machine interface (HMI)) and to devices of the industrial automation system 10 (e.g., OT assets). It should be understood that any suitable number of industrial control architectures 300 may be used in a particular embodiment of an industrial automation system 10 or in a facility that includes multiple industrial automation systems 10. The industrial control architecture 300 may facilitate representing components of the industrial automation system 10 through programming objects that may be instantiated and executed to provide simulated functionality similar or identical to the actual components, as well as visualization of the components, or both, on the display/operator interface 328. The programming objects may include code and/or instruction stored in the industrial control architecture 300 and executed by processing circuitry of the industrial control architecture 300. The processing circuitry may communicate with memory circuitry to permit the storage of the component visualizations.

As illustrated, the display/operator interface 328 depicts representations 330 of the components of the industrial automation system 10. The industrial control architecture 300 may use data transmitted by sensors 318 to update visualizations of the components via changing one or more statuses, states, and/or indications of current operations of the components. In certain embodiments, the edge device 320 may use data transmitted by the sensors 318 to update the visualizations of the components of the industrial automation system 10 over time. These sensors 318 may be any suitable device adapted to provide information regarding process conditions. Indeed, the sensors 318 may be used in a process loop (e.g., a control loop) that may be monitored and controlled by the industrial control architecture 300. As such, a process loop may be activated based on process inputs (e.g., an input from the sensor 318) or direct input from a person via the display/operator interface 328. The person operating and/or monitoring the industrial automation system 10 may reference the display/operator interface 328 to determine various statuses, states, and/or current operations of the industrial automation system 10, a particular component (e.g., OT asset), and/or digital twins of a particular component. Furthermore, the person operating and/or monitoring the industrial automation system 10 may adjust various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, the sensors 318 may gather OT data indicative of one or more operations of the industrial automation system 10 or the industrial control architecture 300. In this way, the OT data may be analog data or digital data indicative of measurements, statuses, alarms, or the like, associated with operation of the industrial automation system 10 or the industrial control architecture 300.

The industrial control architecture 300 described above may operate in an OT space in which OT data is used to monitor and control OT assets, such as the equipment illustrated in the stations 302, 304, 306, 308, 310, 312, 314, 316 of the industrial automation system 10 or other industrial equipment or components. The OT space, environment, or network generally includes direct monitoring and control operations that are coordinated by the industrial control architecture and a corresponding OT asset. For example, a programmable logic controller (PLC) (e.g., controller 12) may operate in the OT network to control operations of an OT asset (e.g., drive, motor). The industrial control architecture 300 may be specifically programmed or configured to communicate directly with the respective OT assets.

Security policies may be developed and implemented based on design artifacts of the industrial automation system 10 and/or information about the architecture of the industrial automation system 10 and how the industrial automation system 10 is intended to operate (e.g., product being produced, industry, location, anticipated operating conditions, and so forth). Further, once a set of security policies have been implemented and/or enforced at one or more security policy enforcement points while the industrial automation system 10 is operating, data collected during the operation of the industrial automation system 10 (e.g., run-time data, help ticket data, incident data, vulnerability data, data received from one or more service providers, one or more customers, one or more partner organizations, one or more suppliers, and so forth) may be used to generate recommended updates to the current set of implemented and/or enforced security policies.

Figure 4:
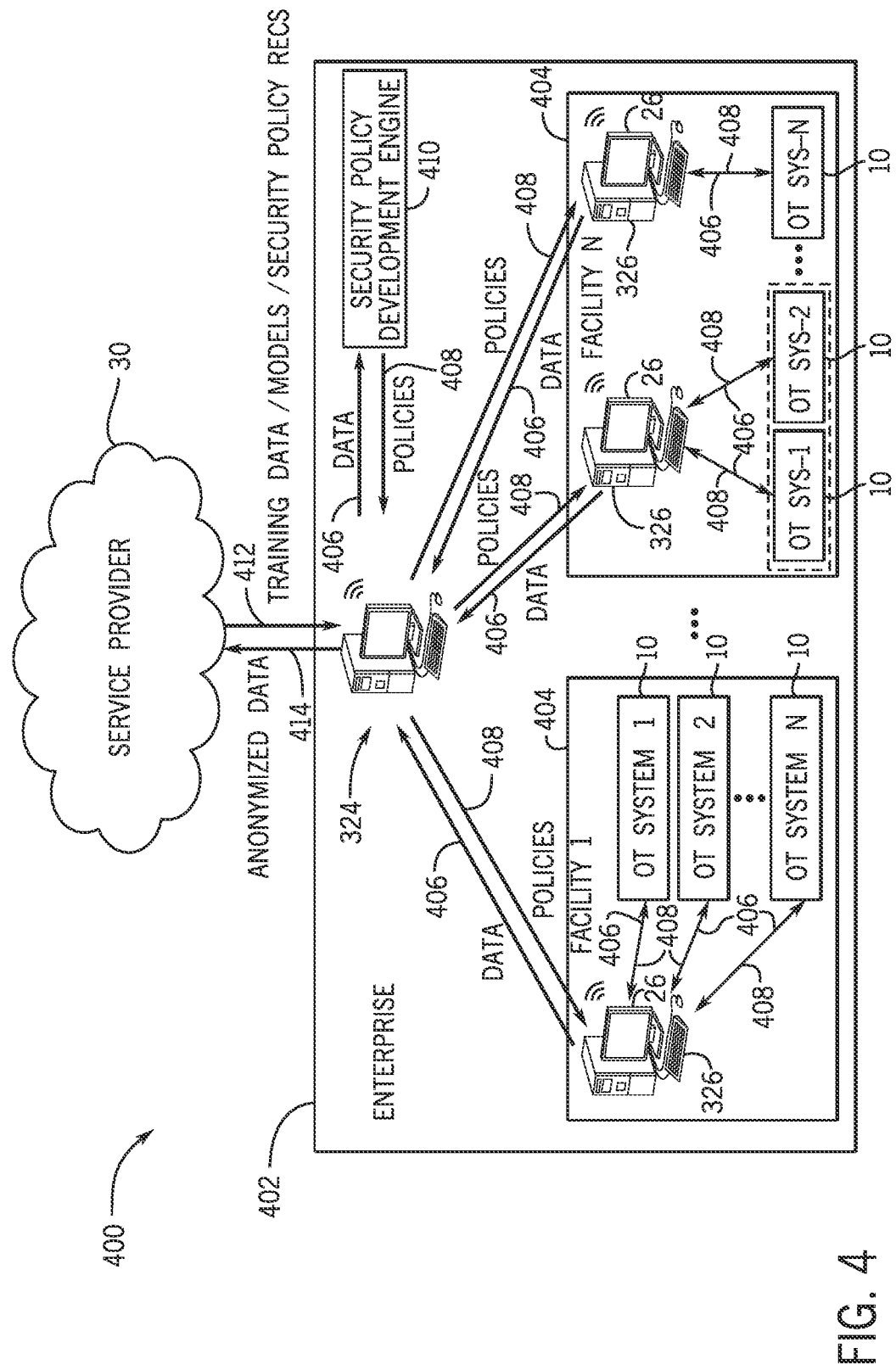
FIG. 4 is a schematic illustrating an architecture for managing security policies within an enterprises, in accordance with embodiments presented herein.

FIG. 4 illustrates a schematic of an architecture 400 for managing security policies within an enterprise 402 via an enterprise-level security policy management tool, which may be a software package instantiated on one or more computing devices 26 disposed throughout the enterprise 402. As shown, the enterprise 402 may operate multiple facilities 404, each having one or more industrial automation systems 10, managed by the enterprise system 324 (e.g., one or more computing devices 26). Operations of each facility 404 may be managed by one or more plant management systems 326 (e.g., one or more computing devices 26). Though not shown, in some embodiments, some facilities 404 may be further subdivided into areas having one or more industrial automation systems 10 under the control of a respective management system (e.g., a computing device 26 running control software). The industrial automation systems 10 may be disposed behind firewalls and/or within private networks defined by one or more firewalls. A single private network may encompass an entire facility 404, an area of a facility 404 that includes one or more industrial automation systems 10, or individual industrial automation systems 10 within a facility 404, or spanning multiple facilities 404. The enterprise system 324 and the plant management systems 326 managing the various facilities 404 operated by the enterprise 402, as well as other computing devices 26 disposed throughout the enterprise 402, may run software for managing operations of the enterprise 402, including the enterprise-level security policy management tool.

For example, a user may utilize the enterprise-level security policy management tool running on the enterprise system 324 to manage security policies for the entire enterprise 402. That is, the enterprise-level security policy management tool may be utilized to create new security policies, edit existing security policies, remove existing security policies, activate security policies, deactivate security policies, deploy specific security policies to specific facilities 404, areas, and/or industrial automation systems 10 operated by the enterprise, and/or make adjustments to how security policies are enforced throughout the enterprise 402. In some embodiments, security policies may only be managed downstream of where the enterprise-level security policy management tool is instantiated. For example, a user accessing the enterprise-level security policy management tool at the enterprise system 324 may be able to manage security policies for the entire enterprise 402, whereas a user accessing the enterprise-level security policy management tool at the plant management systems 326 for Facility 1 may be able to manage security policies within Facility 1, but may not be authorized to manage security policies for Facility N. Similarly, a user accessing the enterprise-level security policy management tool via one of the plant management systems 326 of Facility N may only be able to manage security policies for the industrial automation systems 10 that are under the control of the plant management system 326 being used (e.g., OT SYS-1 and OT SYS-2, but not OT SYS-N). However, in other embodiments, authority to manage security policies within an enterprise 402 may be determined based on other factors, such as authority granted to specific users or user profiles, the type of security policies to be managed, components affected by changes, etc.

Computing devices 26 within the enterprise 402 that run the enterprise-level security policy management tool may act as enforcement points for security policies or otherwise facilitate enforcement of security policies within the enterprise 402. For example, if a user makes a modification to a security policy at the plant management system 326, the modification is reflected in the other instantiations of the enterprise-level security policy management tool throughout the enterprise 402 such that the plant management system 326 of Facility 1 may make sure that the security policy is enforced as modified by the industrial automation systems 10 within the facility 404. However, it should be understood that computing devices 26 running the enterprise-level security policy management tool may not be the only enforcement points within an enterprise 402. Indeed, other devices, such as edge devices, firewalls, controllers, and even industrial automation systems 10 themselves may act as security policy enforcement points.

The enterprise-level security policy management tool may also be used to analyze collected data to develop new security policies and/or modifications to existing security policies. In some embodiments, the collected data may be discovery data and/or network topology data that may be analyzed to determine characteristics of the OT network and, in some embodiments, generate visualizations (e.g., network maps) of the OT network. Specifically, characteristic information (e.g., IP addresses, MAC addresses, serial numbers, etc.) may be used to identify and/or characterize components that appear in data until a topology (e.g., map) of the whole OT network can be generated. In such embodiments, the data may include a manufacturer name, a product name, a model name, a model number, a serial number, a firmware version, a software version, a port status, captured network traffic, Common Industrial Protocol (CIP) discovery data, link layer discovery protocol (LLDP) data, network traffic data, Open Platform Communications Unified Architecture (OPC-UA) data, and so forth. Data 406 may also be collected from the industrial automation systems 10 in a facility 404 during operation. The collected data may include, for example, design artifacts, help ticket data, incident data, vulnerability data, network traffic data, captured network traffic (e.g., data packets), device logs, data received from one or more service providers, notes provided by an operator, software/firmware update data, warning data, error code data, operational data, temperature data, pressure data, speed/rotation data, quality control data, and so forth. Design artifacts and/or operational data may be provided to the enterprise system 324, which aggregates the data 406 and uses it to generate recommended security policies 408 or modifications to existing security policies (e.g., via a security policy development engine 410). The recommended security policies 408 are implemented and/or enforced (e.g., via one or more security policy enforcement points) within the enterprise 402 and/or distributed by the enterprise system 324 to the facilities 404 or particular industrial automation systems 10 within the enterprise 402. Once security policies 408, or updates to security policies, have been implemented and/or enforced, new data 406 may be collected and used to retrain and/or refine the security policy development, or to evaluate revised security policies 408.

Though the embodiment shown in FIG. 4 uses the enterprise system 324 (e.g., instantiated on the computing device 26), to aggregate data 406, interface with or run the security policy development engine 410, and implement, enforce, and/or disseminate security policies 408, it should be understood that embodiments are envisaged in which a plant management system 326 or industrial automation controller performs these functions. That is, aggregating data 406, running the security policy development engine 410, and implementing/enforcing security policies 408 may be performed at various levels of an enterprise's structure (e.g., the device level, the system level, the facility level, the enterprise level, one or more intermediate levels, or distributed among multiple levels).

In some embodiments, the security policy development engine 410 may be run on an edge device in an OT network. In such embodiments, the edge device may receive design artifacts and/or run-time data 406 from one or more devices on an OT network, input the received data to a security policy development engine 410 running on the edge device, and generate a set of recommended security policies, which may be automatically implemented/enforced, presented to a user for approval, presented to a user for consideration, or some combination thereof, via the enterprise-level security policy management tool. The security policy development engine 410 may run on a processor of the edge device within an operating system, or the security policy development engine 410 may run in a container that is managed by a container orchestration system (e.g., Docker, KUBER-NETES®) instead of, or in addition to, the edge device. The container orchestration system may operate in an IT environment and may include a cluster of multiple computing devices that coordinates an automatic process of managing or scheduling work of individual containers (e.g., operating system level virtualization) for applications within the computing devices of the cluster. In other words, the container orchestration system may be used to automate various tasks at scale across multiple computing devices.

By way of example, the container orchestration system may automate tasks such as configuring and scheduling of containers, provisioning deployments of containers, determining availability of containers, configuring applications in terms of the containers that they run in, scaling of containers to equally balance application workloads across an infrastructure, allocating resources between containers, performing load balancing, traffic routing and service discovery of containers, performing health monitoring of containers, securing the interactions between containers, and the like. In any case, the container orchestration system may use configuration files to determine a network protocol to facilitate communication between containers, a storage location to save logs, and the like. The container orchestration system may also schedule deployment of containers into clusters and identify a host (e.g., node) that may be best suited for executing the container. After the host is identified, the container orchestration system may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry as container images. The container registry may be any suitable data storage or database that may be accessible to the container orchestration system. The container image may correspond to an executable software package that includes the tools and data employed to execute a respective application. That is, the container image may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system. The deployment configuration file may be stored in the container registry along with the respective container images associated with the deployment configuration file. The deployment configuration file may include a list of different pods and a number of replicas for each pod that should be operating within the container orchestration system at any given time. Each pod may correspond to a logical unit of an application, which may be associated with one or more containers. The container orchestration system may coordinate the distribution and execution of the pods listed in the deployment configuration file, such that the desired state is continuously met. In some embodiments, the container orchestration system may include a primary node that retrieves the deployment configuration files from the container registry, schedules the deployment of pods to the connected nodes, and ensures that the desired state specified in the deployment configuration file is met. For instance, if a pod stops operating on one node, the primary node may receive a notification from the respective worker node that is no longer executing the pod and deploy the pod to another worker noted to ensure that the desired state is present across the cluster of nodes.

The container orchestration system includes a cluster of computing devices, computing systems, or container nodes that may work together to achieve certain specifications or states, as designated in the respective container. In some embodiments, container nodes may be integrated within industrial control systems. That is, container nodes may be implemented by the industrial control systems, such that they appear as worker nodes to the primary node in the container orchestration system. In this way, the primary node of the container orchestration system may send commands to the container nodes that are also configured to perform applications and operations for the respective industrial equipment and components.

In some embodiments, the enterprise 402 may purchase or subscribe to services 412, such as machine learning models, training data for training machine learning models, and/or recommended security policies to the enterprise 402, provided by a service provider 30. In some embodiments, the enterprise may collect data 414 to transmit to the service provider 30 that provides some information about the effectiveness of the policies deployed within the enterprise 402. Accordingly, the service provider 30 may use data 414 collected from one or more customer enterprises 402 to improve machine learning models and/or the training data provided to the enterprises 402. Customers may choose to opt in or opt out of providing data to the service provider 30. In some cases, because enterprises may be hesitant to share data, data may be anonymized, masked, pseudonymized, generalized, or otherwise scrubbed before being transmitted to the service provider. For example, characteristic data elements (e.g., names, addresses, IP addressed, MAC addresses, phone numbers, network names, passwords, employee names, employee numbers, employee information, etc.) within the data may be identified and removed and/or changed before being transmitted. Further, data elements related to industrial processes, settings of the industrial automation systems, set points, trade secrets, intellectual property, or other proprietary information may be identified and removed or changed before being transmitted. Further, the service provider 30 may take additional steps to secure the data received by the enterprise 402, such as using a secure communication channel, encrypting data for transmission, encrypting data for storage, and so forth.

Figure 5:
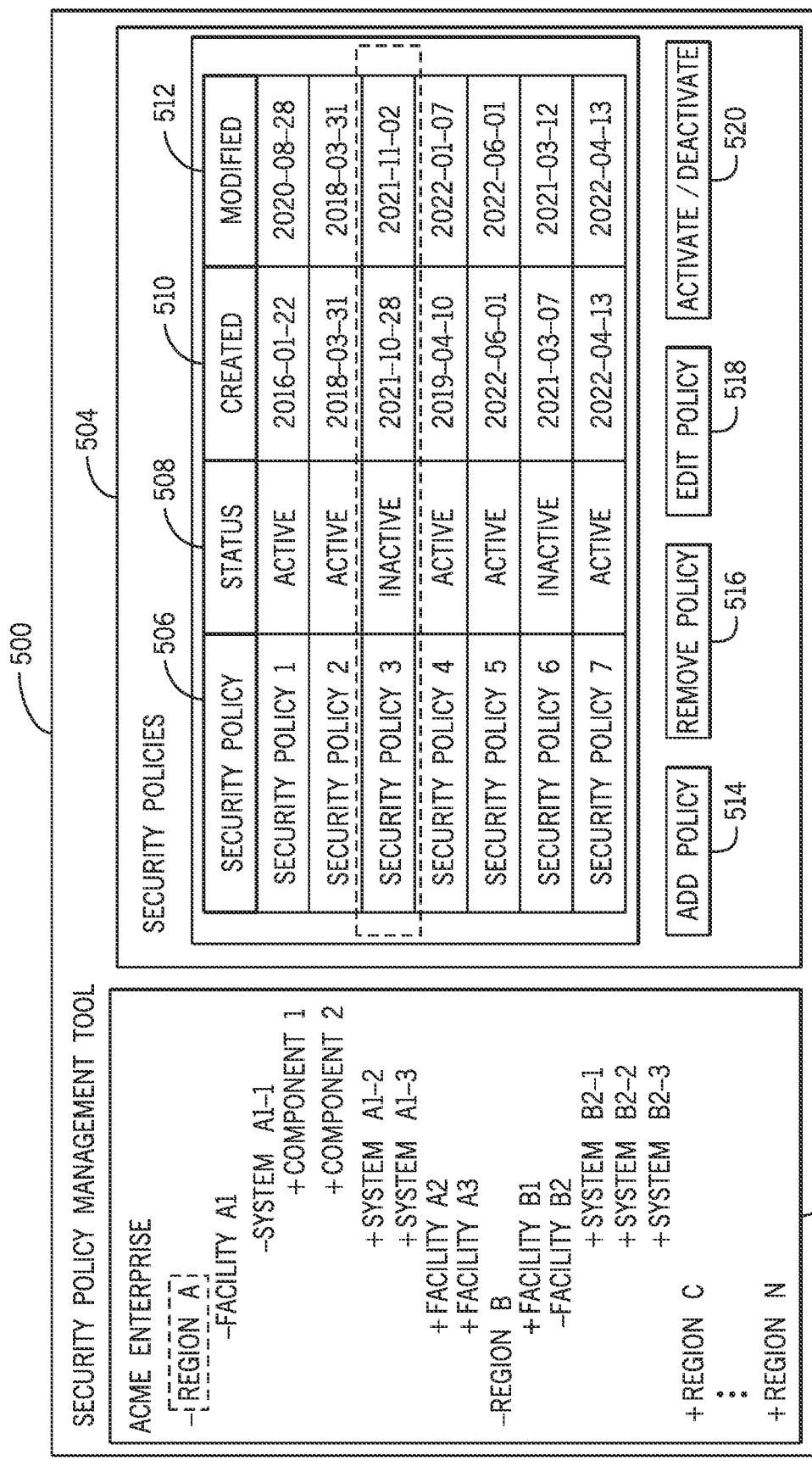
FIG. 5 is a screenshot of a graphical user interface (GUI) of an enterprise-level security policy management tool for managing security policies within an enterprise in which Region A has been selected, in accordance with embodiments presented herein.

With the preceding in mind, FIGS. 5-8 illustrate various aspects of an example graphical user interface (GUI) of the enterprise-level security policy management tool. Specifically, FIG. 5 is an example screenshot of a GUI 500 of the enterprise-level security policy management tool for managing security policies within an enterprise. As shown, the GUI include a first region 502 and a second region 504. The first region 502 includes a listing of the enterprise's assets. In the illustrated embodiment, the enterprise's assets are organized by region and facility in an expandable/collapsible tree list format. Specifically, various facilities operated by the enterprise may be grouped into different regions. The regions may be expanded to display the facilities within the region and collapsed to hide the facilities. Similarly, individual facilities may be expanded to display assets (e.g., industrial automation systems, production lines, areas, individual components, etc.) disposed within the facility. In some embodiments, facilities may be further subdivided into areas, production lines, etc. Accordingly, a user may navigate through various levels to reach a specific industrial automation system or even specific industrial automation components. However, it should be understood that the enterprise's assets may be organized, displayed, and/or filtered in some other way. For example, though facilities are grouped into regions in FIG. 5, in other embodiments, facilities may be organized by function (e.g., refinery, bottling plant, transport, waste processing, etc.), organized by order of process (e.g., upstream, downstream), organized by size, or listed without groupings and sorted and/or filtered according to some criteria (e.g., alphabetically, size, location, production stream, etc.). As shown in FIG. 5, ACME enterprises operates facilities in Region A, Region B, Region C, and so on. Region A includes Facility A1, Facility A2, and Facility A3. Facility A1 includes System A1-1, System A1-2, and System A1-3. System A1-1 includes Component 1 and Component 2. Region B includes Facility B1 and Facility B2. Facility B2 includes System B2-1, System B2-2, and System B2-3. However, it should be understood that the specific combination of enterprise, regions, facilities, systems, and components shown in FIG. 5 are merely an example and other combinations are also envisaged.

The GUI 500 is configured such that when an element is selected in the first region 502 of the GUI 500, the second region 504 of the GUI 500 displays information about the selected element. For example, in FIG. 5, because Region A is selected in the first region 502 of the GUI 500, the second region 504 of the GUI 500 displays information about Region A. Specifically, in FIG. 5, the second region 504 of the GUI 500 displays information about security policies implemented in Region A. As shown, the displayed security policy information may be in the form of a list of security policies in place at the selected element (e.g., region, facility, system, component, etc.). In the embodiment shown in FIG. 5, the listing for each security policy may include a security policy name 605, a status 508, a date created 510, and a date last modified 512. The status 508 field for each security policy may, for example, indicate that the security policy is active, inactive, expired, pending approval, approved, queued for implementation, etc. The date created 510 field indicates the date the security policy was created and the date last modified 512 indicates the date that the security policy was last modified. Though not shown, the second region 504 may also identify the author or creator of the security policy, the manager that manages enforcement of the security policy, etc.

A security policy may be selected from the list to view and/or edit the security policy, activate or deactivate the policy, delete the policy, and so forth. For example, an add policy button 514 may be used to add new policies to the list and a remove policy button 516 may be used to remove policies from the list. When a policy has been selected, the edit policy button 518 may be used to view more information about the policy and edit various aspects of the security policy, as shown and described below with regard to FIG. 7. The activate/deactivate button 520 may be used to activate security policies for enforcement within the selected enterprise, region, facility, system etc., or deactivate security policies from enforcement within the selected enterprise, region, facility, system etc.

Figure 6:
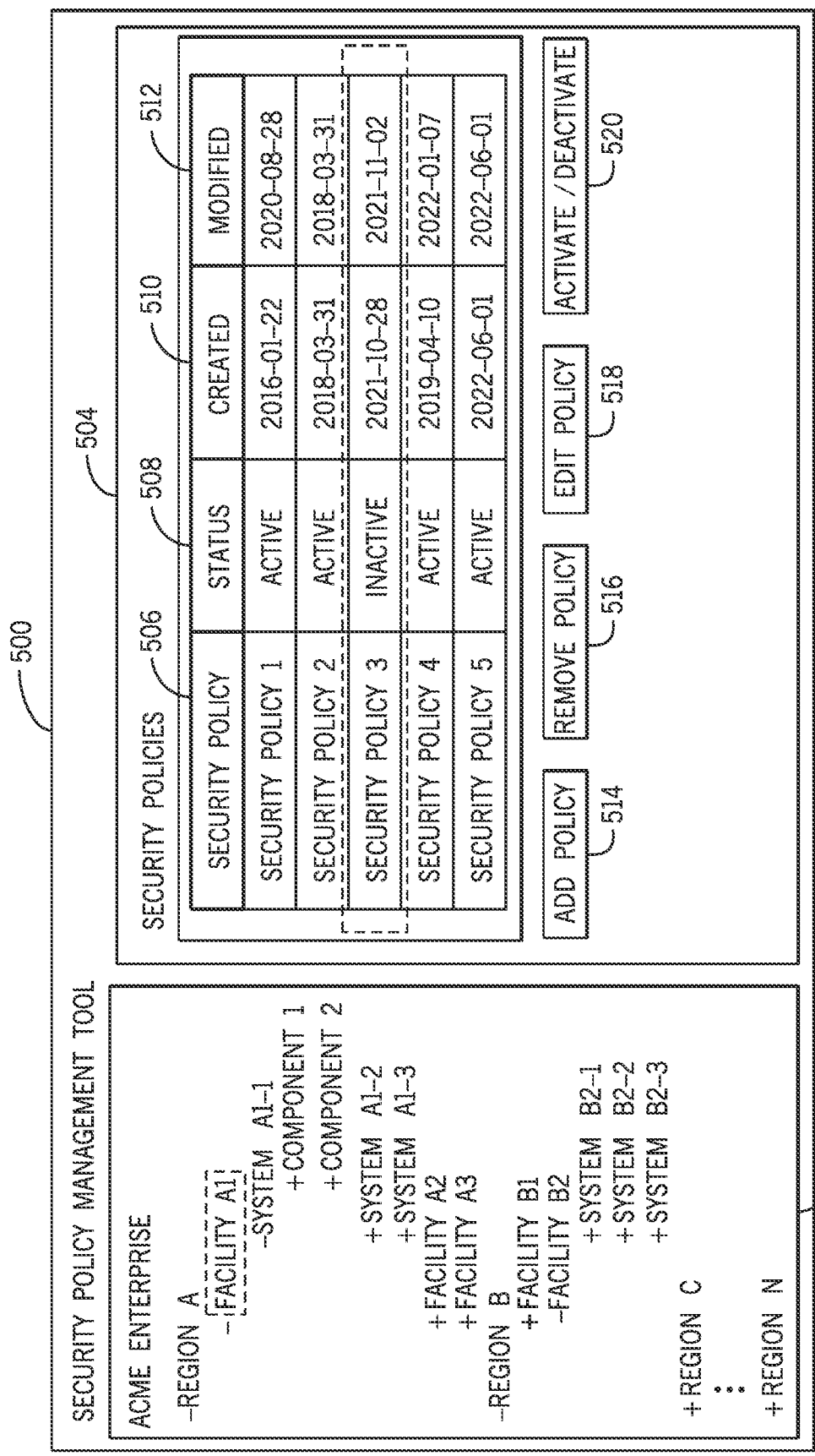
FIG. 6 is a screenshot of the GUI of the enterprise-level security policy management tool for managing security policies within the enterprise in which Facility A1 has been selected, in accordance with embodiments presented herein.

As previously discussed, the second region 504 of the GUI 500 is updated based on the selection within the first region 502 of the GUI. Accordingly, in FIG. 5, the security policies listed in the second region 504 are security policies that have been applied within Region A. FIG. 6 illustrates how the GUI 500 responds when a user navigates to Facility A1. That is, when a user selects Facility A1 in the first region 502, the list of security policies shown in the second region 504 updates to show only the security policies that have been applied to Facility A1. Accordingly, the list of security policies shown in the second region 504 of FIG. 6 is a shorter list of security policies than in FIG. 5, which includes security policies applied within Region A.

Figure 7:
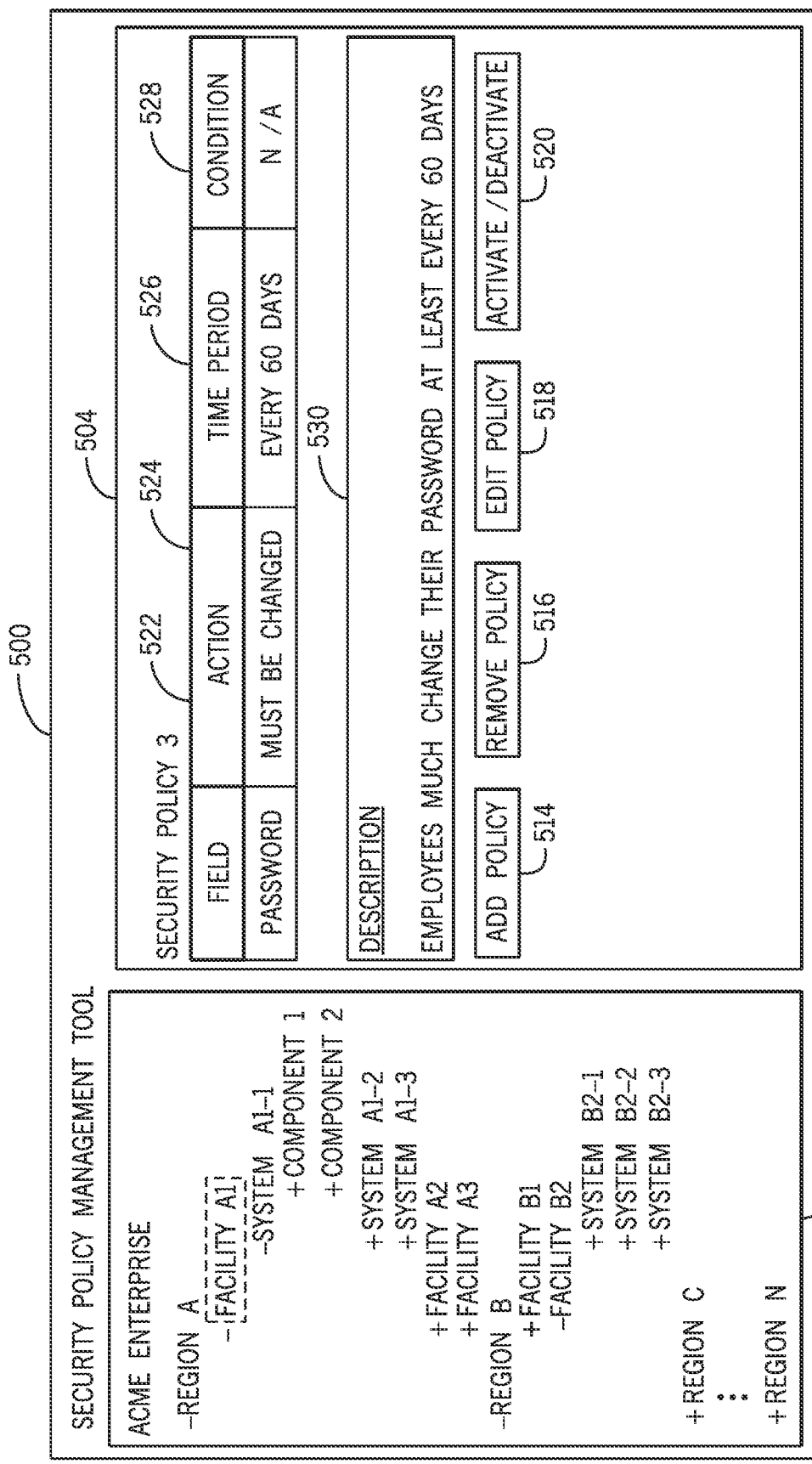
FIG. 7 is a screenshot of the GUI of the enterprise-level security policy management tool for managing security policies within the enterprise in which Security Policy 3 is being edited, in accordance with embodiments presented herein.

As previously described, a user may use the edit policy button 518 to edit a selected policy. Accordingly, FIG. 7 is a screenshot of the GUI 500 after a user selects the edit policy button 518 to edit Security Policy 3. Specifically, the second region 504 of the GUI updates to show more information about the selected policy (e.g., Security Policy 3). In the illustrated embodiment, in an edit security policy mode, the second region 504 displays the parameters that define the security policy, which may be modified by a user to change the security policy. For example, the security policy may be defined by a field 522, an action 524 that occurs to the field 522, a time period 526 at which the action 524 occurs, and/or a condition 528 at which the action occurs. The second region 504 may also include a description field 530 that provides a description of the security policy and/or contains notes about the security policy. In the illustrated example, the security policy dictates that employees must change their passwords every 60 days. However, it should be understood that other security policies may be defined in similar ways and that other security policies may be defined in different ways or by using different parameters.

Figure 8:
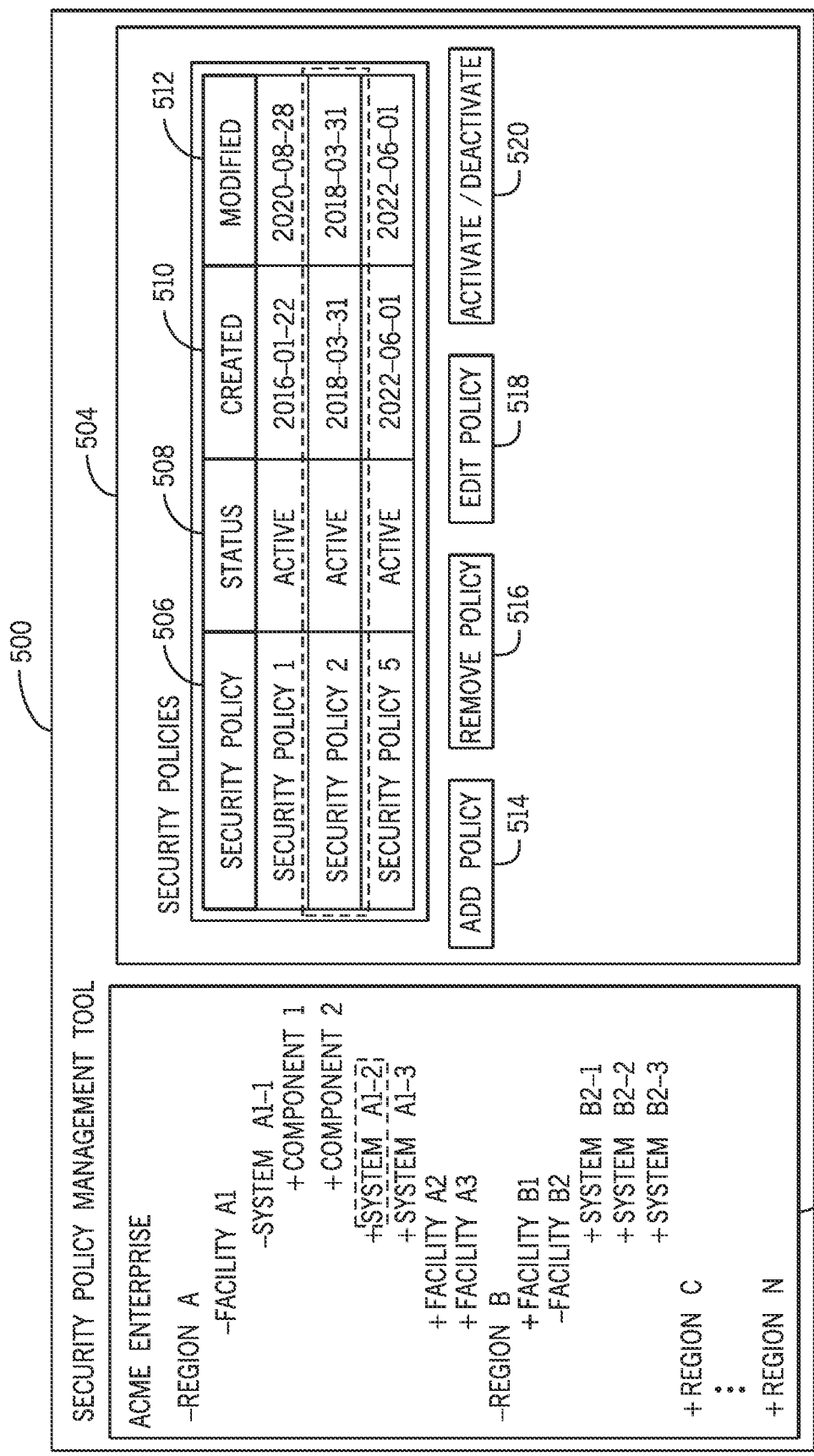
FIG. 8 is a screenshot of the GUI of the enterprise-level security policy management tool for managing security policies within the enterprise in which System A1-2 is selected, in accordance with embodiments presented herein.

FIG. 8 illustrates how the GUI 500 responds when a user navigates to System A1-2 within Facility A1. That is, when a user selects System A1-2 in Facility A1 in the first region 502 of the GUI, the list of security policies shown in the second region 504 of the GUI updates to show only the security policies that have been applied to System A1-2. Accordingly, the list of security policies shown in the second region 504 of FIG. 8 is a shorter list of security policies than in FIG. 5, which includes security policies applied within Region A, and FIG. 6, which includes security policies applied within Facility A1.

Though FIGS. 5-8 depict a GUI used to manage security policies, it should be understood that embodiments are envisaged in which security policies are managed outside of the GUI. For example, security policies may be created, activated, deactivated, modified, and so forth automatically (e.g., based on certain conditions being present), by default, by a machine learning engine, via some other enterprise management tool, etc. Along these lines, though not shown in FIGS. 5-8, the enterprise level security policy management tool may be configured to interface with other enterprise management tools or interfaces, either in the OT environment, the IT environment, or both. For example, the enterprise level security policy management tool may receive data (e.g., asset characteristics, system design, operating parameters, maintenance information, operating conditions, environmental conditions, access history, etc.) from one or more other enterprise management tools or interfaces and use the received data to generate security policies. Further, in some embodiments, the enterprise level security policy management tool may receive security policies to implement from one or more other enterprise management tools or interfaces. In some embodiments, the enterprise level security policy management tool output security policies or data to one or more other enterprise management tools or interfaces for implementation and/or analysis.

FIG. 9 is a flow chart of a process 600 for managing security policies within an enterprise that operates multiple OT networks from the perspective of a centrally located instantiation of an enterprise-level security policy management tool. At 602, data is received from computing devices or industrial automation components within the enterprise. The data may include discovery data, design artifacts, help ticket data, incident data, vulnerability data, network traffic data, captured network traffic (e.g., data packets), device logs, data received from one or more service providers, notes provided by an operator, software/firmware update data, warning data, error code data, operational data, temperature data, pressure data, speed/rotation data, quality control data, and so forth. In some embodiments, data may be aggregated at one or more aggregation points as the data flows up the enterprise from the device level to the enterprise level. In some cases, aggregating devices may add metadata or contextual data to aggregated data. As such, the data may be received directly from an industrial automation component, or from some aggregating component.

At 604, a visualization is generated based on the received data. For example, the visualization may include a GUI for managing security policies within the enterprise, as shown and described with regard to FIGS. 5-8. In some embodiments, the visualization may include components of one or more OT networks operated by the enterprise, such as network maps, component lists, visual renderings, etc. At 606, inputs are received that define one or more security policies within the network. The inputs may, for example, define a new policy or modify an existing policy. The inputs may also dictate how the security policy is deployed and/or enforced within the enterprise. At 608, a security policies may then be created or modified based on the received inputs. In some embodiments, security policies may be automatically generated (e.g., using machine leaning, a script, a programmed algorithm, a lookup table, etc.) based on data received from one or more other tools and/or interfaces. Further, in some embodiments, security policies may be received from one or more one or more other tools and/or interfaces for implementation. The security policy may take the form of a script, a portion of code, a collection of parameters/settings, or captured in some other way.

At 610, the one or more security policies are transmitted to the computing devices within the enterprise. That is, the one or more security policies may be transmitted from the enterprise level and distributed at the various aggregation points back down to the system and/or device level. In some embodiments, all security policies may be distributed throughout the network and selectively enforced based on the definition of each policy. However, in other embodiments, security policies may be selectively distributed such that security policies are only distributed to portions of the enterprise where they have been deployed and will be enforced. Security policies may be transmitted via a push system (security policies are transmitted to devices), a pull system (security policies are retrieved by devices), or via a hybrid push/pull system (e.g., security policies are pushed to an intermediate component and then pulled from that intermediate component), or some combination thereof.

FIG. 10 is a flow chart of a process 700 for receiving and enforcing security policies within an OT network from the perspective of a local instantiation of a security policy management tool. At 702, data is collected and transmitted (e.g., pushed, pulled, or both) to a centrally located instantiation of an enterprise-level security policy management tool or an aggregation point disposed between the local instantiation of the security policy management tool and the centrally located instantiation of an enterprise-level security policy management tool. The data may include discovery data, design artifacts, help ticket data, incident data, vulnerability data, network traffic data, captured network traffic (e.g., data packets), device logs, data received from one or more service providers, notes provided by an operator, software/firmware update data, warning data, error code data, operational data, temperature data, pressure data, speed/rotation data, quality control data, and so forth. If the data is sent to an aggregation point, the data may be aggregated with data from received from other components and/or local instantiations of the security policy management tool and then passed on to the centrally located instantiation of the enterprise-level security policy management tool or another aggregation point. In some cases, metadata or contextual data may be added to aggregated data.

At 704, one or more security policies may be received from the centrally located instantiation of the enterprise-level security policy management tool or the aggregation point as the security policies work their way down the enterprise from the enterprise level to the system level or the device level. As previously discussed, in some embodiments, all security policies may be distributed throughout the network and selectively enforced based on the definition of each policy. However, in other embodiments, security policies may be selectively distributed such that security policies are only distributed to portions of the enterprise where they have been deployed and will be enforced.

At 706, the security policy is enforced within the OT network at the security enforcement point. This may include, for example, collecting data about various conditions present in the OT network, comparing the collected data to the parameters defined by the security policy, and taking the action set forth in the security policy. In some embodiments, at 708, data may be collected during enforcement of the security policies and/or normal operations of the OT network and transmitted back to the centrally located instantiation of the enterprise-level security policy management tool or the aggregation point disposed between the local instantiation of the security policy management tool and the centrally located instantiation of an enterprise-level security policy management tool.

The present disclosure includes techniques for managing security policies within an enterprise that operates one or more OT networks. Specifically, data may be passed from industrial automation devices at the device level of an OT network, or from industrial automation systems at the system level of the OT network up to the enterprise level. In some embodiments, data may pass through one or more aggregation points at which data from multiple sources is aggregated. In some embodiments, metadata and/or contextual data may be added at aggregation points. A GUI may be generated based on the received data and displayed to a user. The GUI may be part of an enterprise-level security policy management tool that allows the user to manage security policies within OT networks operated by the enterprise. Specifically, the user may provide inputs, via the GUI, that define new security policies or modify existing security policies. The enterprise-level security policy management tool may then generate security policies to be deployed throughout the OT network(s) operated by the enterprise. Just as collected data may work its way up the OT network from the system/device level to the enterprise level through aggregation points, security policies may work their way down the OT network from the enterprise level to the system/device level via one or more distribution points, which may or may not be the same as the aggregation points. In some embodiments, the security policies may be transmitted to security policy enforcement points that enforce the security policies within the OT network.

Technical effects of using the present techniques include a security professional of an enterprise being able to easily and efficiently manage security policies deployed in one or more OT networks and/or facilities operated by the enterprise via a single security policy management tool. Accordingly, an enterprise can manage security policies at the enterprise level, where most security professionals operate, rather than having to work at the facility or system level. Using the present techniques conserves time and resources, helps an enterprise to have consistent security policies across multiple OT networks and/or facilities, and allows enterprises to adjust security policies quickly.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer readable medium storing instructions defining an enterprise-level instantiation of a security policy management tool that, when executed by a processor, cause the processor to perform operations comprising:
   receiving, via a graphical user interface (GUI), inputs defining a security policy configured to be deployed within an enterprise that operates one or more operational technology (OT) networks;
   generating the security policy based on the inputs; and
   transmitting the security policy to one or more computing devices running respective facility-level instantiations of the security policy management tool, wherein the respective facility-level instantiations of the security policy management tool are configured to facilitate enforcement of the security policy within one or more facilities operated by the enterprise, and wherein the respective facility-level instantiations of the security policy management tool are configured to transmit the security policy to an additional one or more computing devices running system-level instantiations of the security policy management tool, wherein the system-level instantiations of the security policy management tool are configured to facilitate enforcement of the security policy within one or more industrial automation systems operated by the enterprise.

2. The non-transitory computer readable medium of claim 1, wherein the inputs defining the security policy define a new security policy.

3. The non-transitory computer readable medium of claim 1, wherein the inputs defining the security policy modify an existing security policy.

4. The non-transitory computer readable medium of claim 1, wherein transmitting the security policy to the one or more computing devices running the respective facility-level instantiations of the security policy management tool comprises transmitting the security policy to an edge device disposed within an OT network of the one or more OT networks.

5. The non-transitory computer readable medium of claim 1, wherein transmitting the security policy to the one or more computing devices running the respective facility-level instantiations of the security policy management tool comprises transmitting the security policy to a security policy enforcement point disposed within an OT network of the one or more OT networks.

6. The non-transitory computer readable medium of claim 1, wherein transmitting the security policy to the one or more computing devices running the respective facility-level instantiations of the security policy management tool comprises transmitting the security policy to an industrial automation component disposed within an OT network of the one or more OT networks.

7. The non-transitory computer readable medium of claim 1, wherein the security policy comprises one or more rules that govern access to one or more OT assets operated by the enterprise, use of one or more OT assets operated by the enterprise, or both.

8. The non-transitory computer readable medium of claim 7, wherein the one or more rules pertain to antivirus management, data backup, disaster recovery, change management, cryptography usage, data classification, asset classification, data retention, data usage, email protection policies, messaging protection policies, user identity, user access management, incident response, threat protection, internet usage restrictions, mobile device usage, OT network security, password protocols, credential protocols, firmware management, patch management, malware detection, spyware detection, ransomware detection, or wireless network access, or any combination thereof.

9. The non-transitory computer readable medium of claim 1, wherein the operations comprise:
   receiving data from a plurality of computing devices, including the one or more computing devices, disposed in the one or more OT networks operated by the enterprise, wherein the data is associated with operations of the one or more OT networks; and
   generating the GUI, wherein the GUI is configured to display information regarding components within the one or more OT networks, the operations of the plurality of the one or more OT networks, or both.

10. The non-transitory computer readable medium of claim 9, wherein the received data is associated with operations of one or more of the components within the one or more OT networks.

11. The non-transitory computer readable medium of claim 9, wherein the received data is discovery data indicative of one or more characteristics of one or more of the components within the one or more OT networks.

12. A non-transitory computer readable medium storing instructions defining a facility-level instantiation of a security policy management tool that, when executed by a processor, cause the processor to perform operations comprising:

receiving, from a system-level instantiation of the security policy management tool, data associated with operations of an operational technology (OT) network operated by an enterprise;

transmitting, to a central computing device running an enterprise-level instantiation of the security policy management tool, the data associated with the operations of the OT network operated by the enterprise, wherein the central computing device running the enterprise-level instantiation of the security policy management tool is configured to manage security policies for two or more OT networks, including the OT network;

receiving, from the central computing device running the enterprise-level instantiation of the security policy management tool, a security policy; and facilitating enforcement of the security policy within the OT network operated by the enterprise.

13. The non-transitory computer readable medium of claim 12, wherein the security policy comprises one or more rules that govern access to one or more OT assets operated by the enterprise, use of one or more OT assets operated by the enterprise, or both.

14. The non-transitory computer readable medium of claim 13, wherein the one or more rules pertain to antivirus management, data backup, disaster recovery, change management, cryptography usage, data classification, asset classification, data retention, data usage, email protection policies, messaging protection policies, user identity, user access management, incident response, threat protection, internet usage restrictions, mobile device usage, OT network security, password protocols, credential protocols, firmware management, patch management, malware detection, spyware detection, ransomware detection, or wireless network access, or any combination thereof.

15. The non-transitory computer readable medium of claim 12, wherein data is associated with operations of one or more industrial automation components within the OT network.

16. The non-transitory computer readable medium of claim 12, wherein the data is discovery data indicative of one or more characteristics of one or more components within the OT network.

17. The non-transitory computer readable medium of claim 12, wherein the central computing device is an edge device.

18. A method, comprising:

receiving data from a plurality of computing devices disposed in a plurality of operational technology (OT) networks operated by an enterprise, wherein the data is associated with operations of the plurality of the OT networks;

generating a GUI configured to display information regarding components within the plurality of the OT networks, the operations of the plurality of the OT networks, or both, wherein the GUI is displayed within an instantiation of a security policy management tool;

receiving, via the GUI, inputs defining a security policy configured to be deployed within one or more of the plurality of the OT networks operated by the enterprise;

generating the security policy based on the inputs;

transmitting the security policy to one or more of the plurality of computing devices running respective facility-level instantiations of the security policy management tool, wherein the respective facility-level instantiations of the security policy management tool are configured to facilitate enforcement of the security policy within one or more of the plurality of OT networks operated by the enterprise; and transmitting the security policy to an additional one or more of the plurality of computing devices running system-level instantiations of the security policy management tool, wherein the system-level instantiations of the security policy management tool are configured to facilitate enforcement of the security policy within the one or more OT networks operated by the enterprise.

19. The method of claim 18, wherein transmitting the security policy to the additional one or more of the plurality of computing devices running the system-level instantiations of the security policy management tool comprises transmitting the security policy to a security policy enforcement point disposed within an OT network of the plurality of OT networks.

20. The method of claim 18, wherein transmitting the security policy to the additional one or more of the plurality of computing devices running the system-level instantiations of the security policy management tool comprises transmitting the security policy to an industrial automation component disposed within an OT network of the plurality of OT networks.

\* \* \* \* \*